United States Patent
Dabirian et al.

(10) Patent No.: US 10,967,316 B2
(45) Date of Patent: Apr. 6, 2021

(54) COMPACT GAS-LIQUID FILTRATION CYCLONE SEPARATION UNIT

(71) Applicant: The University of Tulsa, Tulsa, OK (US)

(72) Inventors: Ramin Dabirian, Tulsa, OK (US); Ram S. Mohan, Broken Arrow, OK (US); Ovadia Shoham, Tulsa, OK (US)

(73) Assignee: The University of Tulsa, Tulsa, OK (US)

( * ) Notice: Subject to any disclaimer, the term of this patent is extended or adjusted under 35 U.S.C. 154(b) by 98 days.

(21) Appl. No.: 16/040,229

(22) Filed: Jul. 19, 2018

(65) Prior Publication Data

US 2019/0022565 A1    Jan. 24, 2019

Related U.S. Application Data

(60) Provisional application No. 62/535,064, filed on Jul. 20, 2017, provisional application No. 62/535,484, filed on Jul. 21, 2017.

(51) Int. Cl.
*B01D 39/16* (2006.01)
*B01D 46/00* (2006.01)
(Continued)

(52) U.S. Cl.
CPC ..... *B01D 39/1623* (2013.01); *B01D 17/0217* (2013.01); *B01D 39/18* (2013.01);
(Continued)

(58) Field of Classification Search
CPC .. B01D 39/1623; B01D 50/002; B01D 45/16; B01D 46/2414; B01D 46/003;
(Continued)

(56) References Cited

U.S. PATENT DOCUMENTS

| 3,545,468 A | 12/1970 | Freeman et al. |
| 4,617,031 A | 10/1986 | Suh et al. |

(Continued)

FOREIGN PATENT DOCUMENTS

| CN | 1824390 A | * | 8/2006 |
| CN | 204147714 | | 2/2015 |

(Continued)

OTHER PUBLICATIONS

Mohan, Design and Development of Gas-Liquid Cylindrical Cyclone Compact Separators for Three-Phase Flow , Jun. 2003 (Year: 2003).*

(Continued)

*Primary Examiner* — Waqaas Ali
(74) *Attorney, Agent, or Firm* — McAfee & Taft

(57) ABSTRACT

Disclosed is a compact separation system suitable for separating components of a multiphase fluid stream. The compact separation system utilizes a cylindrical cyclone in conjunction with a filtration system. The filtration system incorporates filtration media having at least one of the following characteristics: hydrophilic-oleophobic characteristics or oleophilic-hydrophobic characteristics. The separation system is configured to substantially preclude gas under-carrying into the liquid conduit lines.

26 Claims, 13 Drawing Sheets

(51) Int. Cl.
  *B01D 46/24* (2006.01)
  *B01D 45/16* (2006.01)
  *B01D 17/02* (2006.01)
  *B01D 39/18* (2006.01)
  *B01D 50/00* (2006.01)

(52) U.S. Cl.
  CPC ........... *B01D 45/16* (2013.01); *B01D 46/003* (2013.01); *B01D 46/0012* (2013.01); *B01D 46/0017* (2013.01); *B01D 46/2414* (2013.01); *B01D 50/002* (2013.01); *B01D 2201/16* (2013.01); *B01D 2239/025* (2013.01); *B01D 2239/0421* (2013.01); *B01D 2239/0428* (2013.01)

(58) Field of Classification Search
  CPC ........... B01D 46/0012; B01D 46/0017; B01D 39/18; B01D 17/0217; B01D 2239/0428; B01D 2239/025; B01D 2201/16; B01D 2239/0421
  See application file for complete search history.

(56) References Cited

U.S. PATENT DOCUMENTS

| | | | |
|---|---|---|---|
| 5,112,479 A | | 5/1992 | Srimongkolkul |
| 5,407,584 A | | 4/1995 | Broussard, Sr. |
| 5,882,530 A | | 3/1999 | Chase |
| 6,197,188 B1 | * | 3/2001 | Lamoureux ............ B01D 36/02 210/138 |
| 6,210,575 B1 | | 4/2001 | Chase et al. |
| 6,790,256 B2 | | 9/2004 | Means |
| 7,594,941 B2 | | 9/2009 | Zheng et al. |
| 8,114,283 B2 | | 2/2012 | Parkinson |
| 8,568,515 B2 | | 10/2013 | Mantilla et al. |
| 2006/0086253 A1 | | 4/2006 | Gaur et al. |
| 2012/0152122 A1 | * | 6/2012 | Mantilla ............ B01D 17/045 95/253 |
| 2014/0251140 A1 | | 9/2014 | Sams et al. |
| 2015/0007532 A1 | | 1/2015 | Kira et al. |
| 2015/0300997 A1 | * | 10/2015 | Kriel .................. G01N 33/2823 73/23.42 |

FOREIGN PATENT DOCUMENTS

| | | |
|---|---|---|
| CN | 205858319 U * | 1/2017 |
| WO | 2013091719 | 6/2013 |

OTHER PUBLICATIONS

Sulzer Chemtech, Gas/Liquid Separation Technology, pp. 1-24, United States.

Shoubo Wang, et al., Gas-Liquid Cylindrical Cyclone (GLCC) Compact Separators for Wet Gas Applications, 2001, pp. 1-11, United States.

Dr. Ram S. Mohan and Dr. Ovadia Shoham, Design and Development of Gas-Liquid Cylindrical Cyclone Compact Separators for Three-Phase Flow, Semi-Annual Technical Progress Report, Apr. 29, 2002, pp. 1-36.

G. E. Kouba, et al., A Review of Gas-Liquid Cylindrical Cyclone (GLCC) Technology, 1996, pp. 1-25.

Miguel A. Reyes-Gutierrez, et al., Eulerian-Eulerian Modeling of Disperse Two-Phase Flow in a Gas-Liquid Cylindrical Cyclone, 2004, pp. 1-7.

Carsten Mehring, Dispersed Two-Phase Flow in a Gas-Liquid Cylindrical Cyclone Separator, vol. 4, No. 1, 2016, pp. 1-12.

Shoubo Wang, et al., Gas-Liquid Cylindrical Cyclone (GLCC) Compact Separators for Wet Gas Applications, Feb. 2001, pp. 1-11.

Dr. Ram S. Mohan, et al., Design and Development of Gas-Liquid Cylindrical Cyclone Compact Separators for Three-Phase Flow, Final Technical Report, Jun. 25, 2003, pp. 1-46.

Lida Baghernejad, Development and Characterization of Ultra Lightweight, Highly Selective, Filter Media for Oil-Water Mixtures, 2015, pp. 1-253.

* cited by examiner

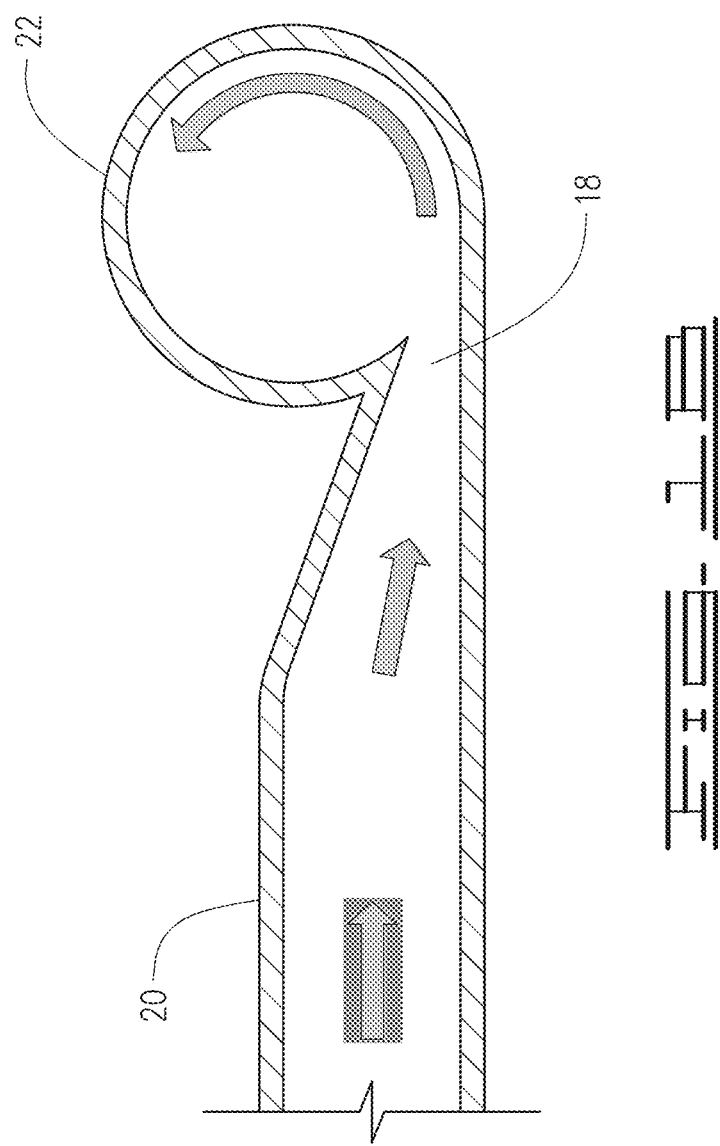

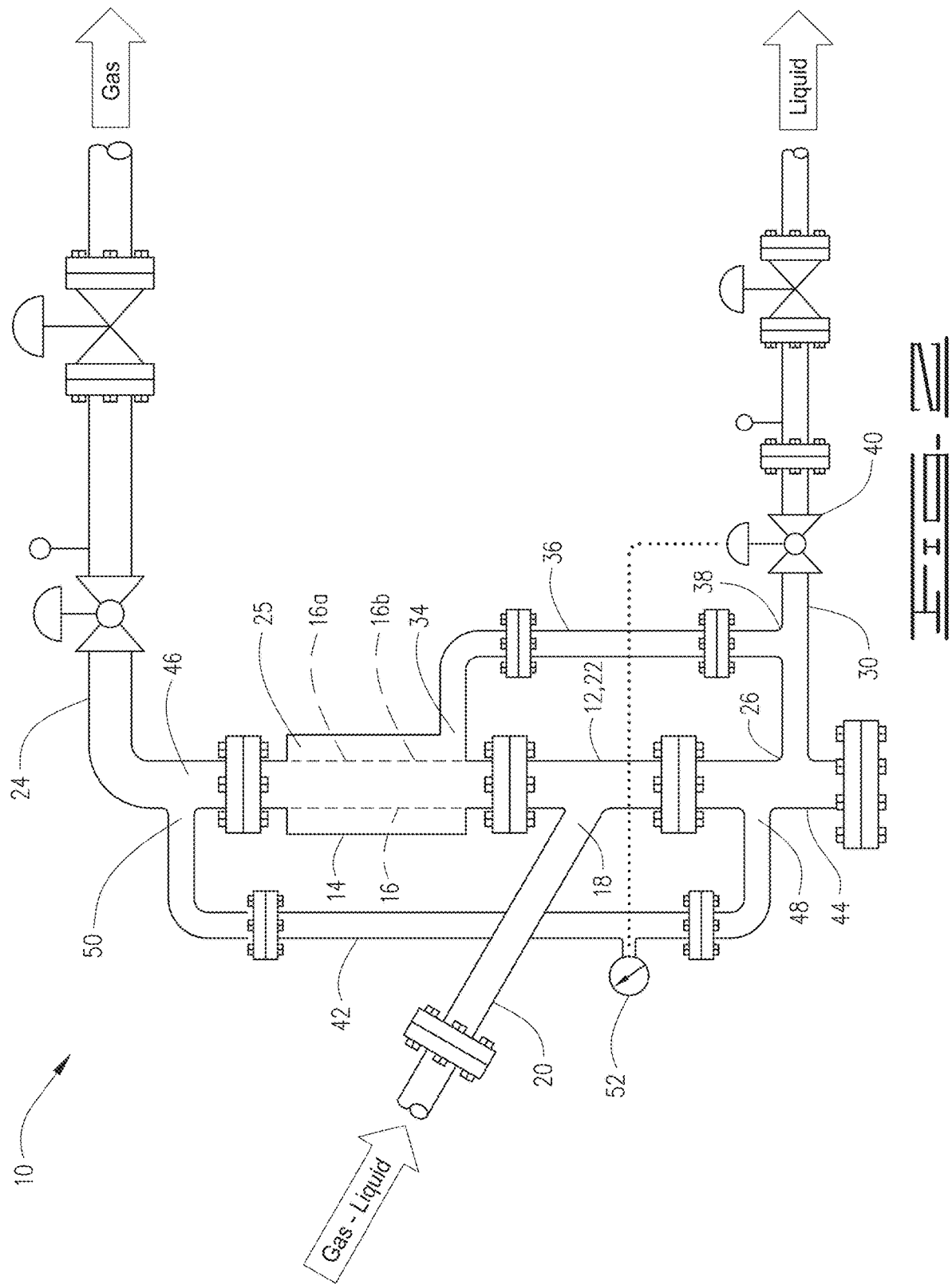

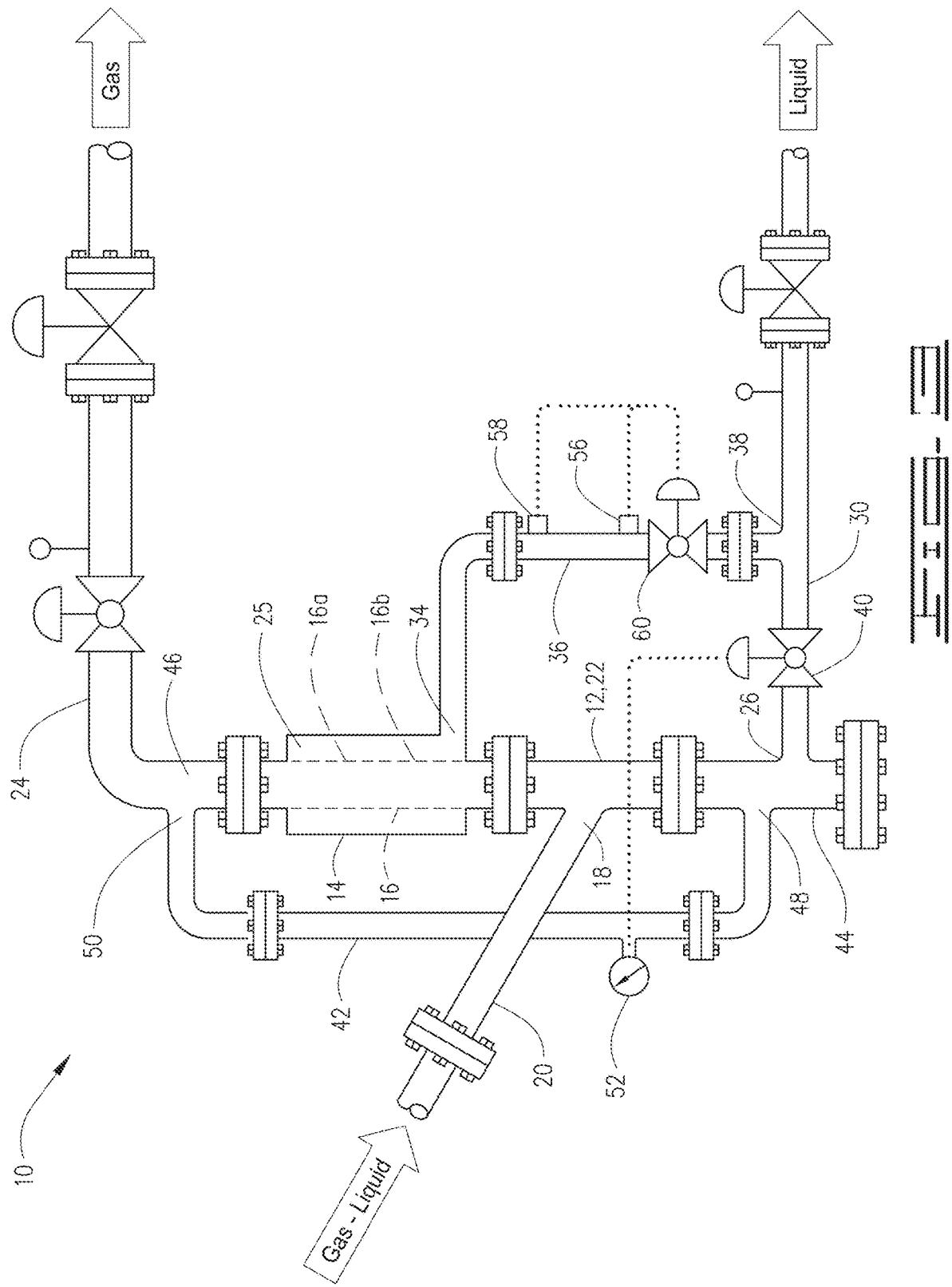

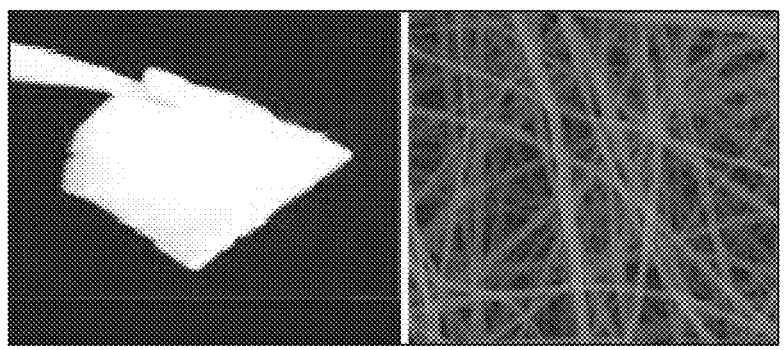
FIG. 4
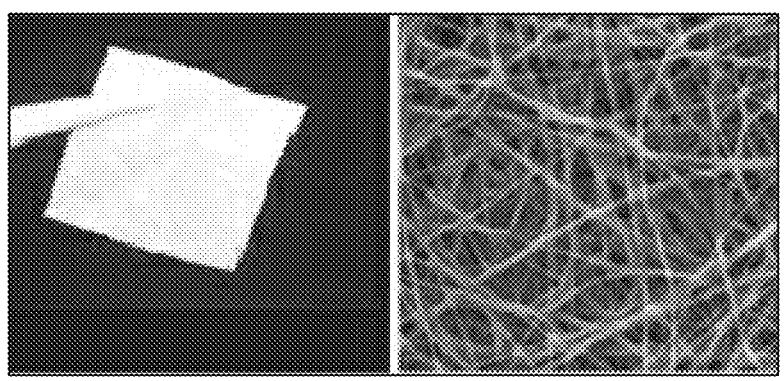
FIG. 5
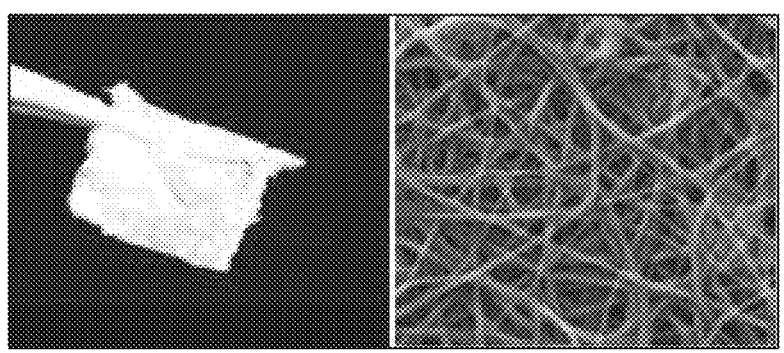
FIG. 6

COMPACT GAS-LIQUID FILTRATION CYCLONE SEPARATION UNIT

CROSS-REFERENCE TO RELATED APPLICATIONS

This application claims priority from U.S. Provisional Patent Application Ser. No. 62/535,064, filed Jul. 20, 2017, entitled Compact Gas-Liquid Filtration Cyclone Separation Unit, and further claims priority from U.S. Provisional Patent Application Ser. No. 62/535,484, filed Jul. 21, 2017, entitled Compact Gas-Liquid Filtration Cyclone Separation Unit, the entire contents of which are incorporated herein by reference.

SUMMARY

The following specification describes a separation system. The separation system comprises a fluid conduit joined by a tangential inlet to a cylindrical cyclone chamber and a fluid collection chamber positioned below the cylindrical cyclone chamber. The fluid collection chamber has a first liquid outlet. Positioned above the cylindrical cyclone chamber is a filtration section having a first end in fluid communication with the cylindrical cyclone chamber and a second end in fluid communication with an overhead fluid outlet conduit. A second liquid outlet provides fluid communication from a lower portion of the filtration section. Additionally, the separation system includes a pressure transducer in fluid communication with the fluid collection chamber and the overhead fluid outlet conduit as well as a first liquid conduit in fluid communication with the first liquid outlet. Positioned within a central portion of the filtration section is a filtration media. The filtration media acts as a conduit such that an exterior surface of the filtration media and an interior surface of the filtration section form an annulus. A second liquid conduit is in fluid communication with the second liquid outlet, such that the first and second liquid conduits are joined in fluid communication by a junction. Finally, a valve moveable from a first open position to a second closed position is positioned downstream of the junction. The pressure transducer controls actuation of the valve.

BRIEF DESCRIPTION OF THE DRAWINGS

FIG. 1B is a top cut-away view taken at line B-B depicting the tangential inlet to the cylindrical cyclone chamber.

FIG. 2 is a schematic depiction of another embodiment of the invention.

FIG. 3 is a schematic depiction of another embodiment of the invention.

FIG. 4 is a photograph of Filter #1 and its Scanning Electron Microscopy (SEM) image.

FIG. 5 is a photograph of Filter #2 and its SEM image.

FIG. 6 is a photograph of Filter #3 and its SEM image.

DETAILED DESCRIPTION

Figure 1A:
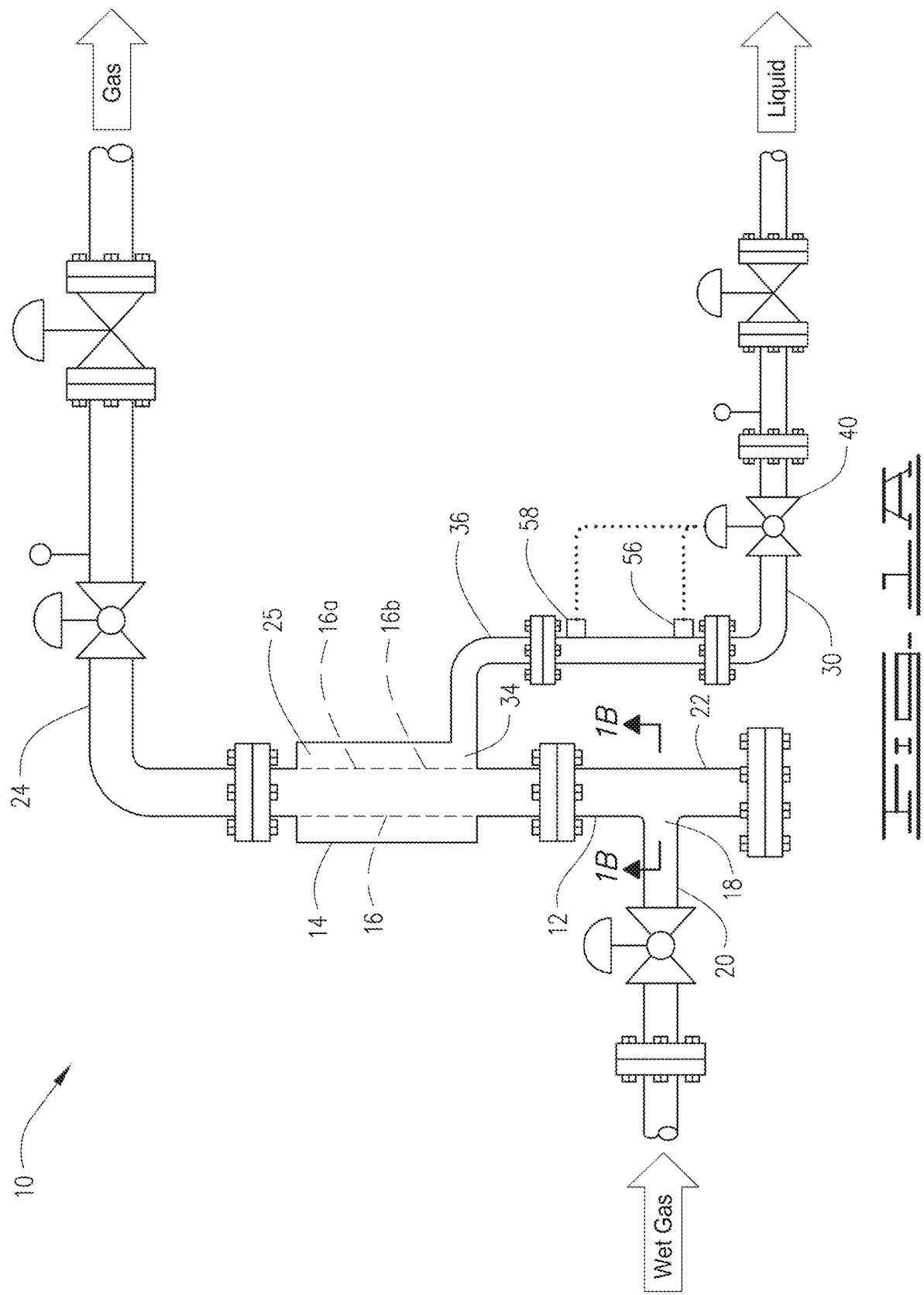
FIG. 1A is a schematic depiction of an embodiment of the invention.
Figure 7:
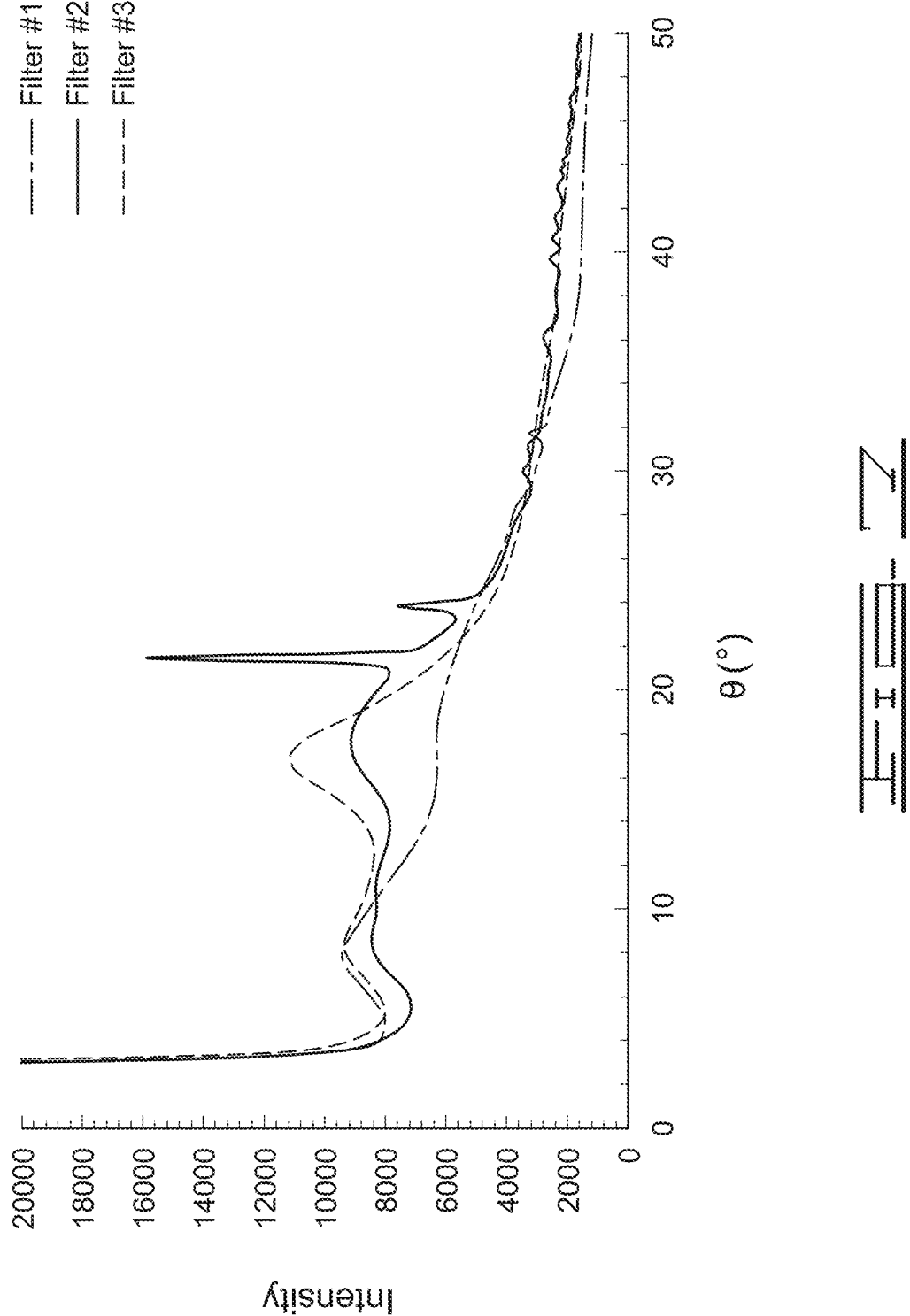
FIG. 7 is a chart showing the X-Ray Diffraction (XRD) profiles of Filters #1, #2, and #3.
Figure 8:
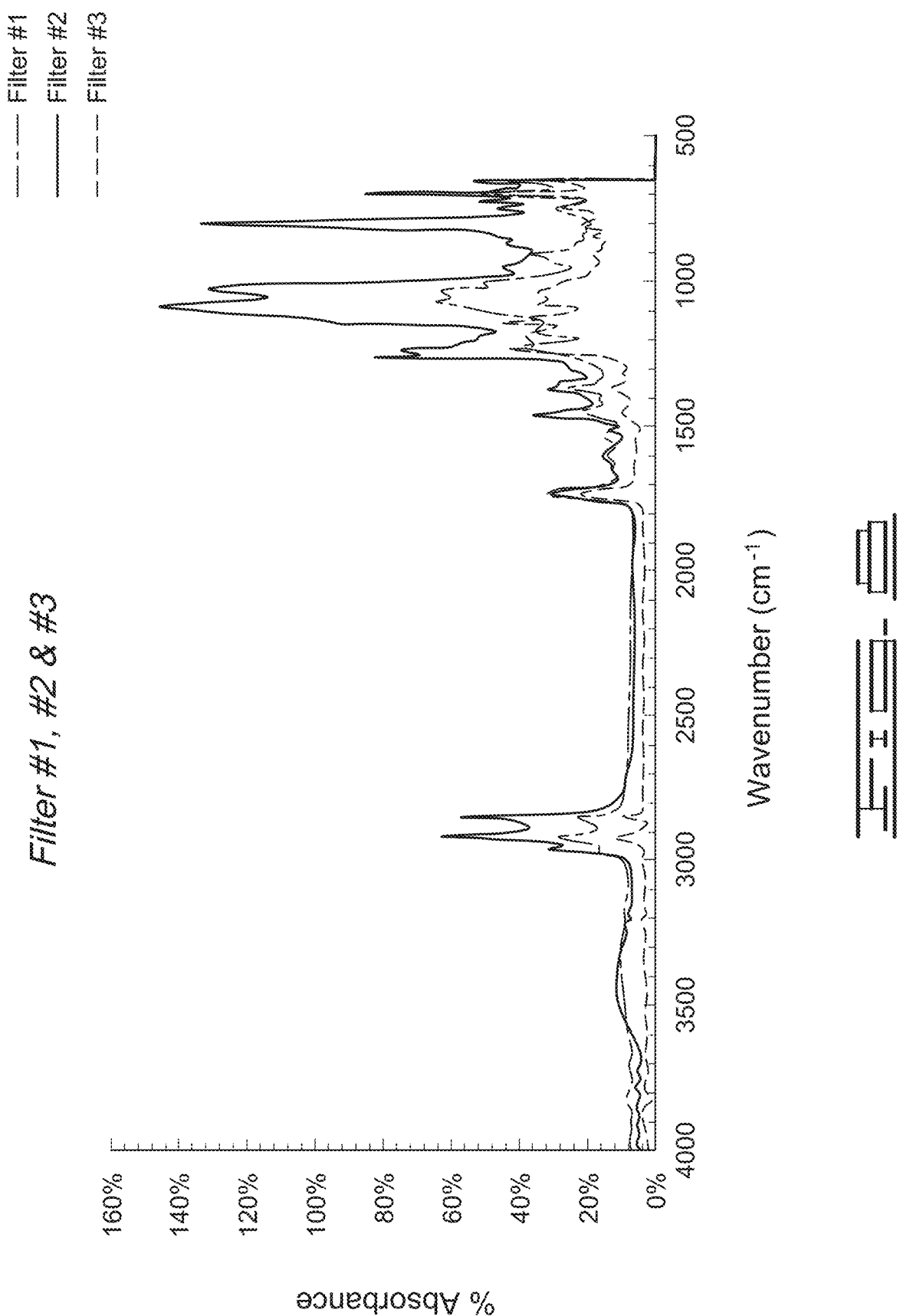
FIG. 8 is a chart showing IR spectra of Filters #1, #2, and #3.
Figure 9:
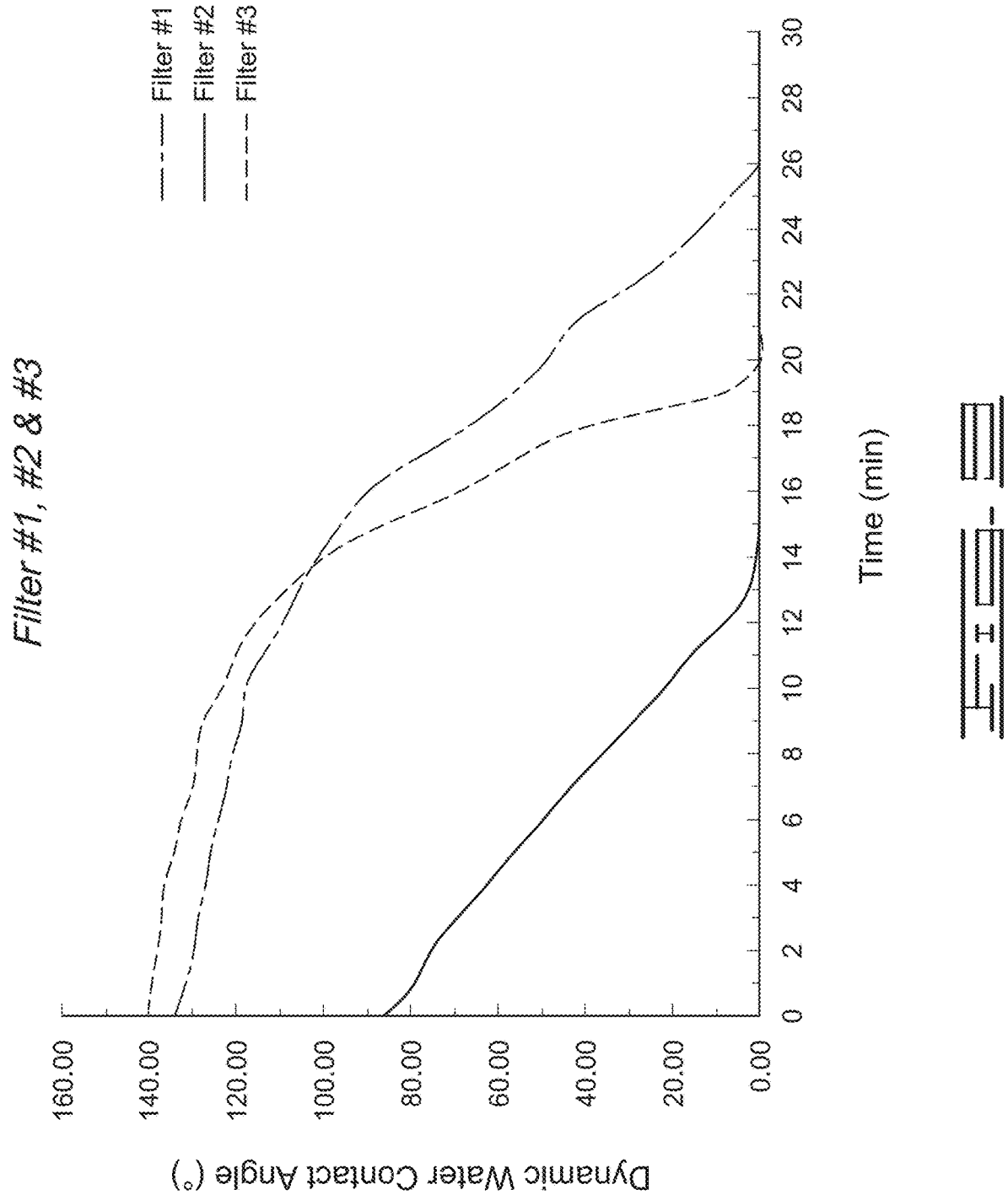
FIG. 9 is a chart showing water droplet retention of Filters #1, #2, and #3.
Figure 10:
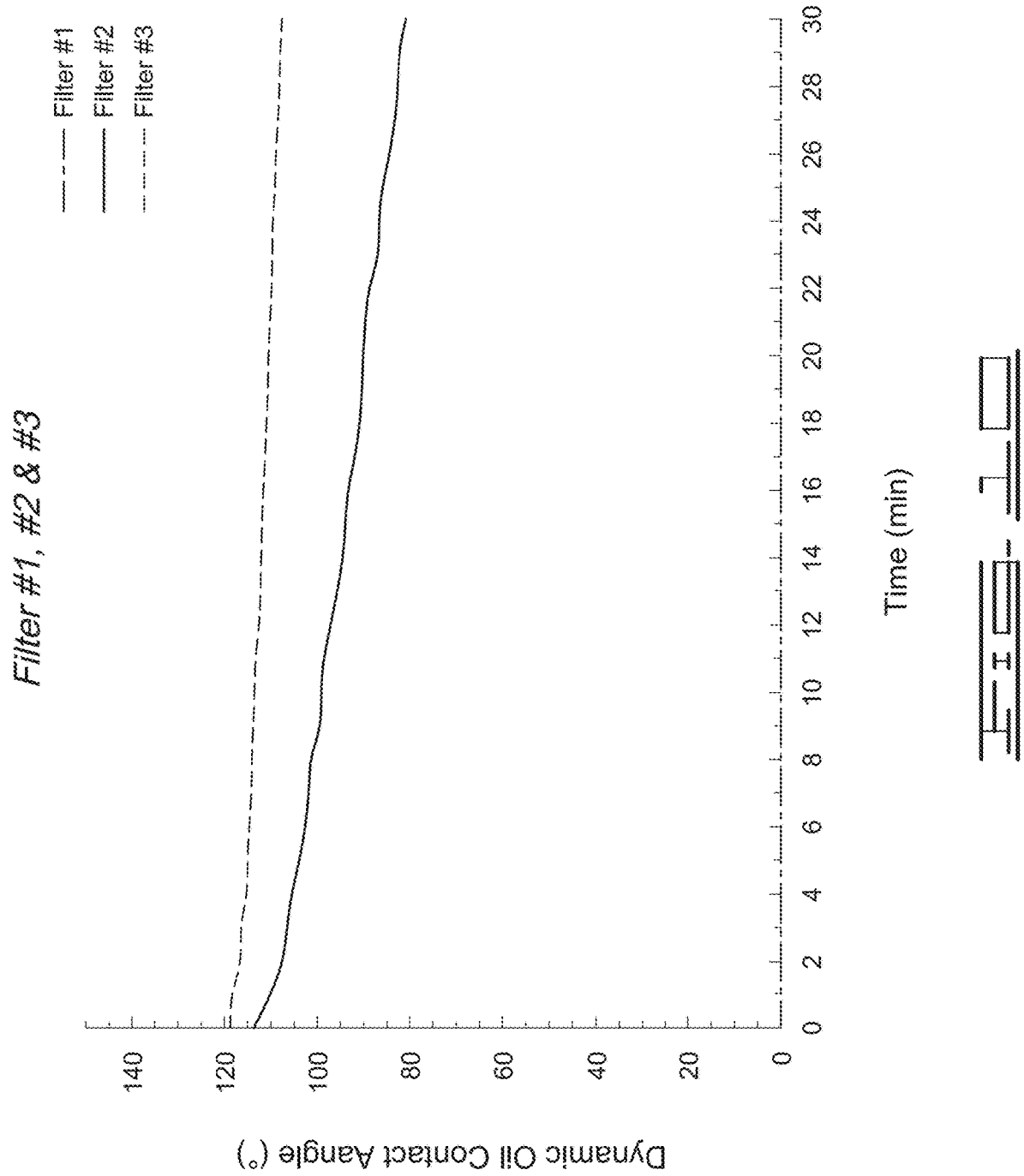
FIG. 10 is a chart showing oil droplet retention of Filters #1, #2, and #3.
Figure 11:
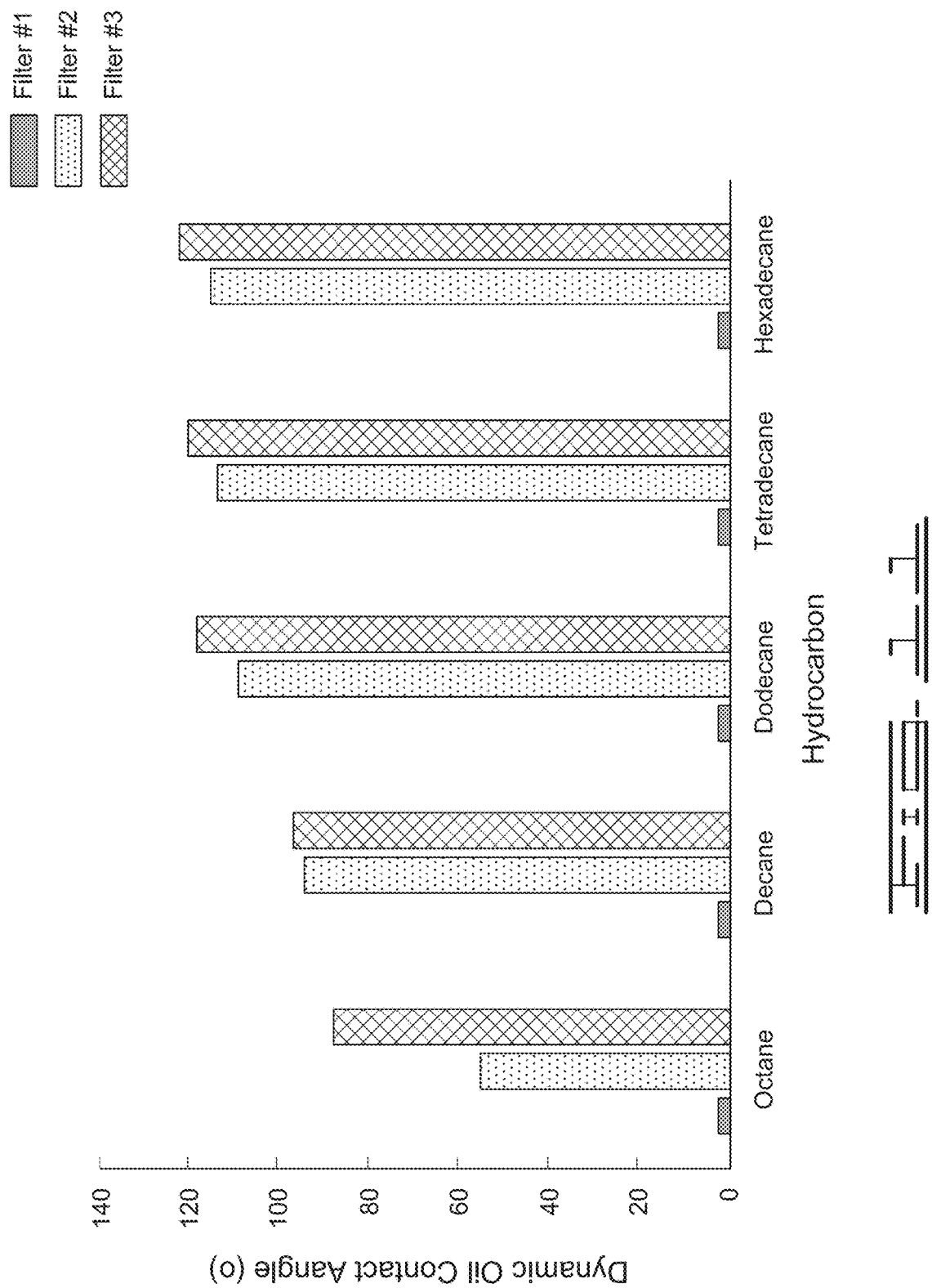
FIG. 11 is a chart showing wettability of Filters #1, #2, and #3 towards various hydrocarbons.
Figure 12:
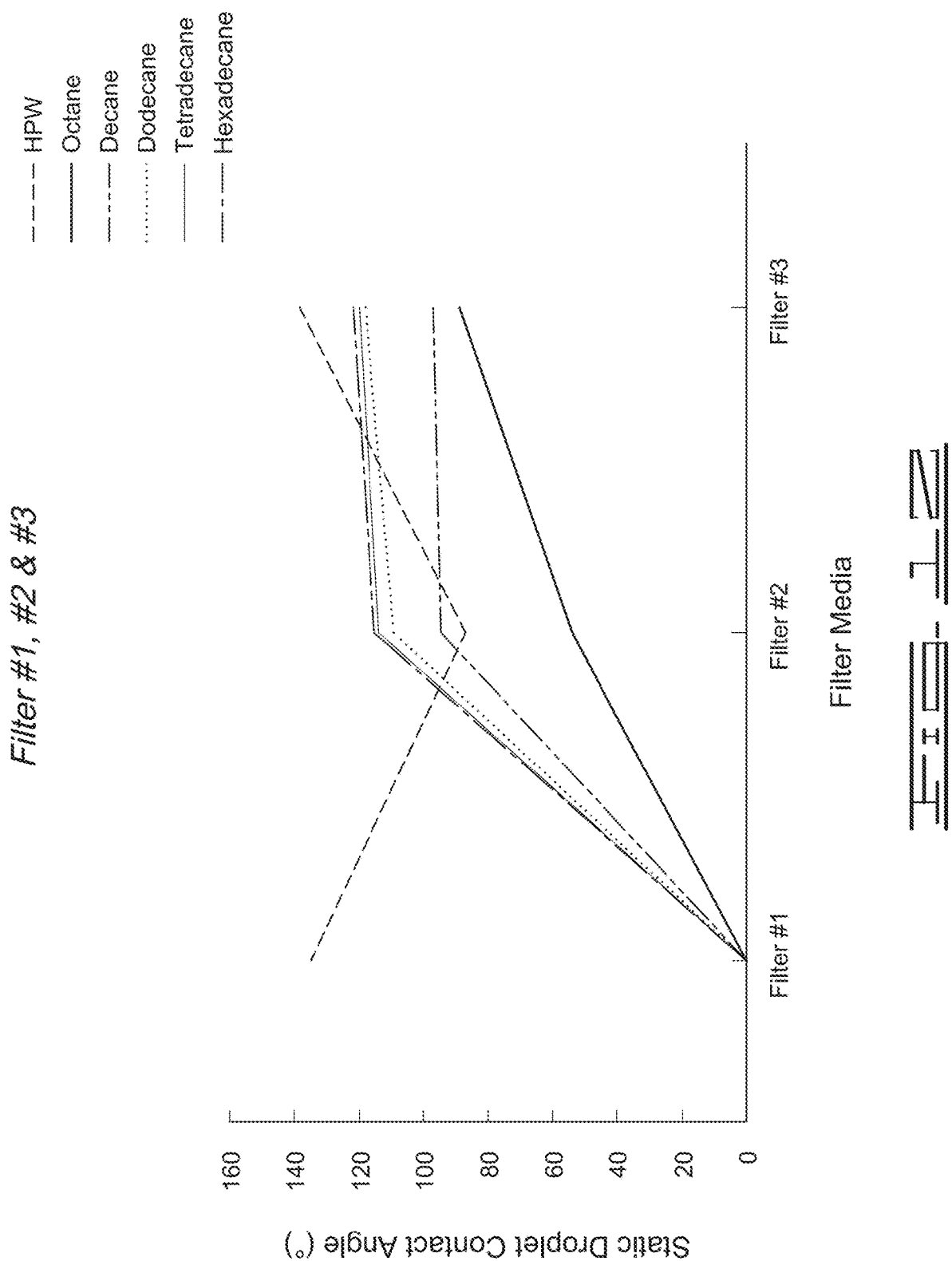
FIG. 12 is a chart showing hydrophobicity and oleophobicity of Filters #1, #2, and #3.

This disclosure provides a separation unit 10 for isolating a gas and a liquid from a multiphase fluid stream. The separation unit utilizes an improved gas-liquid cylindrical cyclone 12. As provided in more detail below, one aspect of the improvement relates to the incorporation of a filtration section 14 which provides for improved separation of one fluid component from another fluid component. The improvement also relates to the configuration of the gas-liquid cylindrical cyclone and associated fluid conduits.

In one embodiment, the filtration section 14 relates to the use of a filtration media 16. In one embodiment, the filtration media is characterized by a non-woven base material formed by electrospinning. Filtration media 16 has a tubular configuration. Thus, filtration media 16 forms a conduit having a central passageway between two open ends. The non-woven base material is treated to impart oleophilic-hydrophobic characteristics to filtration media 16. As a result, filtration media 16 with oleophilic-hydrophobic characteristics repels water and filters hydrocarbons.

In one embodiment, the improvement relates to the use of filtration media 16 having been treated to impart hydrophilic-oleophobic characteristics to filtration media 16. In one embodiment, the filtration media is characterized by a non-woven base material formed by electrospinning. As a result, filtration media 16 with hydrophilic-oleophobic filters water and repels hydrocarbons.

With reference to FIG. 2, in one embodiment, the improvement relates to the configuration of the tangential inlet 18 of separation unit 10. Tangential inlet 18 provides fluid communication from the fluid conduit 20 to the cylindrical cyclone chamber 22. Tangential inlet 18 is configured such that the cross-sectional area of inlet 18 is less than 30% of the cross-sectional area of fluid conduit 20. Typically, the cross-sectional area of tangential inlet 18 is between about 22% and about 30% of the cross-sectional area of fluid conduit 20. Additionally, as depicted in FIGS. 2 and 3, fluid conduit 20, via tangential inlet 18, intersects cylindrical cyclone chamber 22 at an inclined angle. Typically, conduit 20, via tangential inlet 18, intersects cylindrical cyclone chamber 22 at an angle of about 60° to about 70° as measured counterclockwise from the center-line of cylindrical cyclone chamber 22. This configuration improves separation of a multiphase fluid into liquid phase and gas phase streams as a result of the multiphase fluid entering cylindrical cyclone chamber 22. Thus, the resulting gas phase stream is significantly drier than would otherwise be expected. The resulting dry gas phase exits cylindrical cyclone chamber through an overhead conduit 24.

In one embodiment, the improvement relates to a separation unit 10 configured to permit measurement and control of the liquid level in a cylindrical cyclone chamber 22. First liquid conduit line 30 provides the ability to convey liquids isolated from the multiphase stream and collected in the lower portion 44 of separator unit 10 to downstream processing systems.

During operation of separation unit 10, a multiphase stream, e.g. produced natural gas or any gas having entrained liquids, enters cylindrical cyclone chamber 22 from fluid conduit 20 by passing through the tangential inlet 18. Tangential inlet 18 and configuration of cylindrical cyclone chamber 22 impart a swirling action to the gas carrying entrained liquids. As a result, a portion of the liquid separates from the gas and drops to lower portion 44 of separation unit 10 where it is removed through first liquid outlet 26 which provides fluid communication with first liquid conduit 30. Remaining liquid entrained within the gas contacts at least one filter media 16 within cylindrical cyclone chamber 22. The at least one filter media 16 is located centrally within filtration section 14 of separator 10.

As a result of the contact with at least one filter media 16, at least a portion of the entrained liquid is separated from the gas. The separated liquid subsequently flows out of the cylindrical cyclone chamber 22 through a second liquid outlet 34. Second liquid outlet 34 is in fluid communication with a second liquid conduit 36. Second liquid conduit 36 provides fluid communication with the first fluid conduit 30. Downstream of the junction 38 between the first liquid conduit 30 and second liquid conduit 36 is a first valve 40. Valve 40 is movable from a first open position to a second closed position. Preferably, valve 40 is movable through gradual increments. Thus, valve 40 controls the level of fluid within second liquid conduit 36 and within cylindrical cyclone chamber 22.

A third fluid conduit 42 provides fluid communication between the lower portion 44 of separator unit 10 and the upper portion 46. Third fluid conduit 42 having a first inlet 48 located below cylindrical cyclone separation chamber 22 and a second fluid inlet 50 located above filtration section 14. Positioned within third fluid conduit 42 is a differential pressure transducer 52. Differential pressure transducer 52 controls the operation of valve 40 such that at least a portion of second fluid outlet conduit 36 always contains a column of liquid above junction 38. Thus, under preferred operating conditions, cylindrical cyclone chamber 22 will always contain the same level of liquid above junction 26. Thus, the level in cylindrical cyclone chamber 22 will be maintained above junction 26 and below tangential inlet 18. In this manner, this configuration of separator 10 reduces gas carry-under through fluid outlet lines 30 and 36.

FIG. 3 depicts another embodiment of separation unit 10. As depicted in FIG. 3, the embodiment of FIG. 2 has been modified by the addition of at least two liquid level detection sensors 56, 58 and a second valve 60 within the second liquid conduit 36. Additionally, valve 40 has been repositioned between first liquid outlet 26 of separation unit 10 and junction 38 joining first liquid conduit 30 to second liquid conduit 36. In this embodiment, the differential pressure transducer 52 controls actuation of first valve 40 to ensure the presence of sufficient liquid within lower portion 44 of separation unit 10 to preclude gas carry-under through lower portion 44 into first liquid conduit 30. Both valves 40 and 60 are movable from a first open position to a second closed position. Preferably, both valves 40 and 60 are movable through gradual increments.

Additionally, the at least two sensors 56, 58 in second fluid conduit 36 act as a high 58 and low 56 volume liquid sensors. When the column of liquid in second fluid conduit 36 reaches high sensor 58, sensor 58 directs actuation of valve 60 in the second fluid conduit to permit release of liquid from second liquid conduit 36 through junction 38 and downstream to subsequent processing systems. When the column of liquid in the second liquid conduit 36 reaches low sensor 56, low sensor 56 directs actuation of and closure of valve 60. Thus, the sensors 56, 58 and valve 60 cooperate to preclude gas carry-under from cylindrical cyclonic chamber 22 of separator 10.

With reference to FIGS. 2 and 3, differential pressure transducer 52 controls the operation of valve 40. As noted above, in the embodiment of FIG. 2, differential pressure transducer 52 controls the operation of valve 40 such that at least a portion of second fluid outlet conduit 36 always contains a column of liquid above junction 38. The measurements taken by differential pressure transducer are based on the vapor pressure within lower portion 44 of separator unit 10 and the vapor pressure within upper portion 46 as conveyed to differential pressure transducer 52 via fluid conduit 42. When the differential pressure within fluid conduit 42 reflects a loss of fluid in second liquid conduit 36 and 22, differential pressure transducer 52 directs the operation of valve 40 to the closed position. Likewise, when differential pressure transducer 52 reflects a sufficient level of liquid in second liquid conduit 36 and 22, differential pressure transducer 52 directs the operation of valve 40 to the open position. The manner of controlling and actuating of valves by pressure transducers is well known in the art and will not be discussed in further detail herein.

In the embodiment of FIG. 3, differential pressure transducer 52 continues to manage the operation of valve 40 as discussed above. However, in the embodiment of FIG. 3, valve 40 manages only the liquid level within lower portion 44 of separator 10.

As noted above, cylindrical cyclone chamber 22 contains at least one filtration media 16. Filtration media 16 may be characterized by a non-woven base material formed by electrospinning. The non-woven base material may be treated to impart either oleophilic-hydrophobic characteristics or hydrophilic-oleophobic characteristics to filtration media 16. To improve separation of liquids from the gas portion of the multiphase stream, separator 10 will typically use an upper filtration media 16a and a lower filtration media 16b. As depicted in the FIGS. 1, 2 and 3, filtration media 16a has oleophilic-hydrophobic characteristics and filtration media 16b has hydrophilic-oleophobic characteristics. Of course 16a and 16b may be reversed such that 16a has hydrophilic-oleophobic characteristics and 16b has oleophilic-hydrophobic characteristics. Alternatively, the upper and lower filtration media components may be in the form of a single integrated filtration media 16 having region 16a with oleophilic-hydrophobic characteristics and region 16b with hydrophilic-oleophobic characteristics or in the reverse arrangement thereof. Although the FIGS. depict filtration media 16 as having both oleophilic-hydrophobic characteristics or hydrophilic-oleophobic characteristics, a single filtration media component 16 may be provided having only oleophilic-hydrophobic characteristics or hydrophilic-oleophobic characteristics if the incoming gas stream contains only one liquid medium, i.e. water or oil. One suitable filtration media is disclosed in U.S. patent application Ser. No. 15/203,514, filed on Jul. 6, 2016, incorporated herein by reference.

FIG. 1A differs from FIGS. 2 and 3 in that the embodiment of FIG. 1A lacks a differential pressure transducer. Additionally, in the embodiment of FIGS. 1A and 1B, inlet conduit 20 and tangential inlet 18 are not inclined with relation to cylindrical cyclone chamber 22. As depicted best in FIG. 1B, tangential inlet 18 is offset tangentially from cylindrical cyclone chamber 22 and enters perpendicularly to the center-line of cylindrical cyclone chamber 22. Thus, as depicted in FIG. 1B, tangential inlet 18 has a smaller diameter than conduit 20 and is located off-center of the center axis of cylindrical cyclone chamber 22. Accordingly, the off-center configuration of tangential inlet 18 induces a circular flow of the multi-phase fluid stream as it enters cylindrical cyclone chamber 22. Control of carry-under of gas from filtration section 14 is provided in the same manner as described in FIG. 3 less the differential pressure transducer. Specifically, upper and lower liquid sensors 58, 56 direct actuation of and open/closure of valve 40 in response to sensed liquid levels. Thus, liquid sensors 56, 58 and valve 40 cooperate to ensure a liquid column within second liquid conduit 36.

With reference to FIGS. 1-3, during operation of separation unit 10 a multiphase stream enters cylindrical cyclone chamber 22 from fluid conduit 20 through tangential inlet 18. Upon entering cylindrical cyclone chamber 22, the reduced tangential inlet 18 induces a swirling motion inside of cylindrical cyclone chamber 22. The centrifugal forces initially separate the primary liquid phase from the multi-phase stream. In FIGS. 2 and 3, the primary liquid phase drops to lower portion 44 of separator 10 and exits lower portion through first outlet 26.

Within filtration section 14, the liquid droplets of water and hydrocarbon contact filtration media 16 as the fluid stream exits the cylindrical cyclone chamber 22 and flows upward through filtration section 14. As noted above, filtration media 16 is in the form of a conduit having a first open end adjacent to cylindrical cyclone chamber 22 and a second open end adjacent to overhead conduit 24. Typically, filtration media will have an inside diameter that corresponds to the inside diameter of cylindrical cyclone chamber 22.

With a sufficiently high inlet velocity, the remaining wet-gas phase passes upward through cylindrical cyclone chamber 22 into filtration section 14. The wet-gas phase containing entrained liquid hydrocarbons and water droplets subsequently undergoes phase separation such that substantially all the entrained liquid hydrocarbons and water droplets separate from the gas phase portion and are forced radially outward forming a liquid film on the interior surface of filtration media 16. Depending on the nature of the droplet, i.e. hydrocarbon or water, at least one portion of the filtration media 16 will be conducive to collecting and transferring the droplet from the interior of filtration media 16 to the annulus 25 formed by the interior wall of filtration section 14 and filtration media 16. Once in annulus 25 and isolated from the rotational flowing gas, the droplets collect at the bottom of filtration section 14 and flow through second liquid outlet 34 into second liquid conduit 36. As discussed above, embodiments depicted by FIGS. 1-3 provide for retaining a sufficient column of liquid within second liquid conduit 36 to preclude gas carry-under into first liquid conduit 30 and downstream to subsequent processing system.

Details concerning the characteristics and methods for forming one embodiment of filtration material suitable for forming filtration media 16 for use in the above-described separator 10 are provided below. However, these details are provided only to demonstrate one potential embodiment of filtration media 16a and 16b having the desired oleophilic-hydrophobic characteristics and hydrophilic-oleophobic characteristics. The following discussion of the preparation of filtration media 16 does not limit the potential sources of filtration media 16 having oleophilic-hydrophobic characteristics and/or hydrophilic-oleophobic characteristics. Other filtration materials formed into filtration media 16 having these desired characteristics will perform equally well in separator 10.

In one embodiment, filtration media 16 comprises a composite, nanofibrous mat formed from electrospinning a single solution of one cellulose based polymer and one synthetic polystyrene polymer in an organic solvent together, where fibers of the natural polymer are reinforced by fibers of the synthetic polystyrene (PS) polymer. The fibers of the natural polymer may comprise a cellulose-based material such as cellulose acetate (CAc). The mat may have a hydrophobic and oleophilic surface wettability for separating oil from oil-water mixtures, and the filter medium may further comprise one surfactant added to change the surface wettability of the mat from hydrophobic and oleophilic to hydrophilic and oleophobic for separating water droplets from wet gas. The one surfactant may comprise one or more short-chain fluorosurfactants.

Alternately, filtration media 16 may further comprise a combination of two surfactants added to change the surface wettability of the mat from hydrophobic and oleophilic to hydrophilic and oleophobic in order to prepare a filter medium for separating water from oil-water mixtures. At least one of the surfactants may comprise one or more short-chain fluorosurfactants. The two surfactants include one or more short-chain fluorosurfactants and a polysiloxane surfactant mixture to form filtration media 16 that is both hydrophilic and oleophobic.

One method for making filtration media 16 for oil-water separation can be described as comprising: electrospinning a single solution of one cellulose based polymer and one synthetic polystyrene polymer in an organic solvent together to form a composite, nanofibrous mat that is hydrophobic and oleophilic; drying the nanofibrous mat; and applying at least one surfactant to the hydrophobic and oleophilic, nanofibrous mat to form a hydrophilic and oleophobic filter medium. The natural polymer may be CAc. The electrospinning may be conducted at a voltage of between 10 and 50 kV, better between 15 and 35 kV and preferably about 20.0 kV, a feed rate of approximately between 2 and 60 μL/min better between 10 and 40 μL/min preferably 35.00 μL/min, a distance of between 15.0 and 20.0 cm, an ambient humidity of between 20% and 65%, and an ambient temperature of between 20° C. and 25° C. Drying the nanofibrous mat may comprise overnight air drying for up to 24 hours. The method may further comprise heating the nanofibrous mat at about 180° C. for about one hour prior to the step of applying at least one surfactant. Applying at least one surfactant to the nanofibrous mat may comprise completely saturating the nanofibrous mat with at least one surfactant. The method may further comprise blowing gas directly through the filter medium for about five minutes and/or allowing the filter medium to air dry overnight after applying at least one surfactant, either with or without heating the filter medium at up to about 120° C. for about 10 minutes after allowing the filter medium to air dry overnight. At least one surfactant is a short-chain fluorosurfactant and the hydrophobic-oleophilic mat may become a hydrophilic-oleophobic filtration media 16. Alternately, at least one surfactant may include a mixture of one or more short-chain fluorosurfactants and a polysiloxane surfactant and the hydrophobic-oleophilic mat may become a hydrophilic-oleophobic filtration media 16.

To demonstrate the characteristics of filtration media 16 three filter samples were prepared: Filter #1, Filter #2 and Filter #3.

Filter #1 samples were prepared by heating these electrospun materials at 180° C. for 1 hour after allowing them to dry in air, overnight. Two commercially available surfactants from Huntsmann Textile Company (DuPont, Inc.)

named PHOBOL® and ULTRAPHIL® were used to modify the surface chemical properties of Filter #1 samples to produce Filters #2 and #3.

Figure 13:
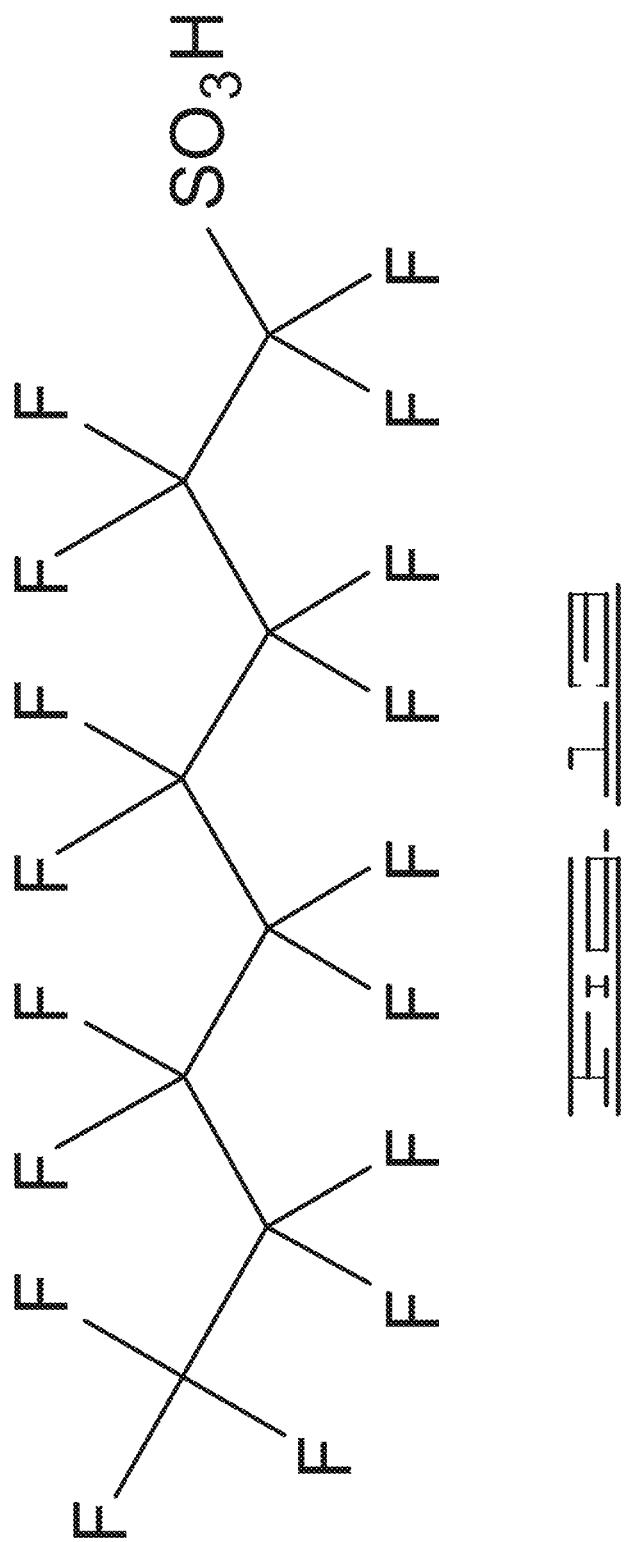
FIG. 13 is a 2D molecular skeletal structure of a fluorosurfactant.
Figure 14:
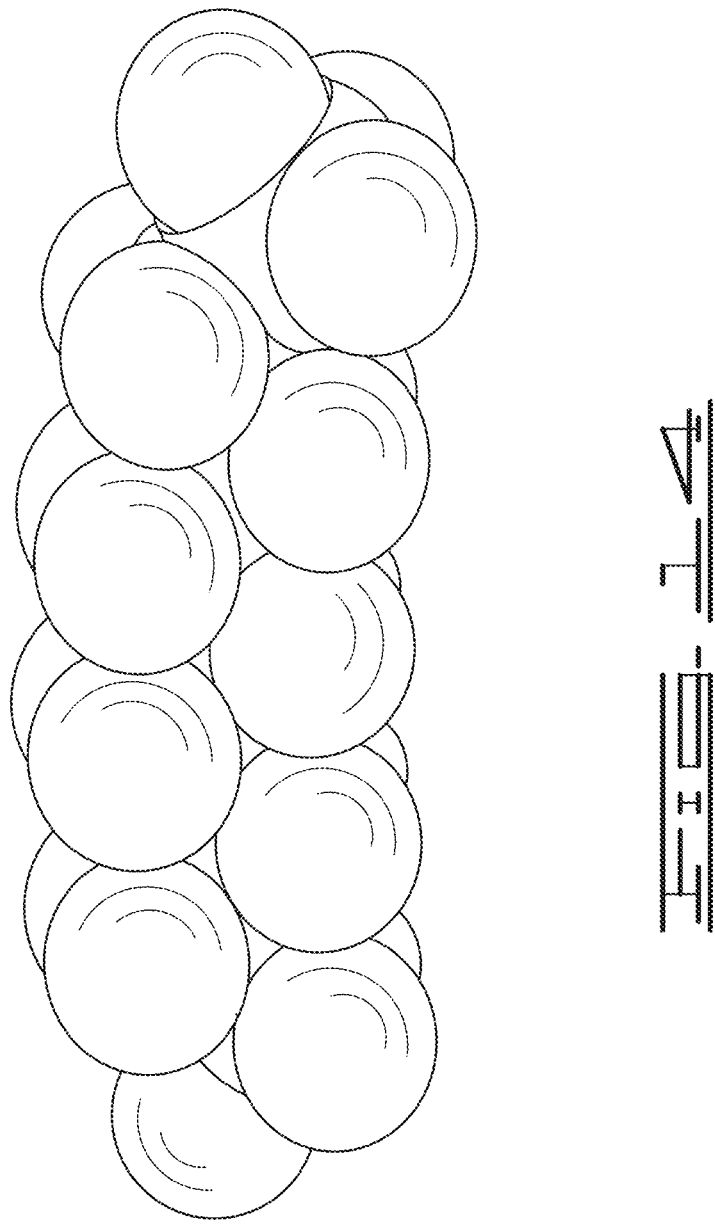
FIG. 14 is a 3D molecular space filling model of a fluorosurfactant.

PHOBOL® is the trade name for fabric finishes sold by Huntsman Textile Company in which the main ingredients are Capstone® repellents and stain-release Teflon fabric protectors produced by DuPont. Capstone® repellents and textile protectors are a broad portfolio of sustainable, performance-driven, fluorine efficient short-chain fluoro-surfactants. Fluorosurfactants are a class of surfactants containing a fluorinated hydrocarbon tail and a nonpolar, polar, or ionic head group, shown in FIGS. 13 and 14. Fluorosurfactants can reduce surface tension of water twice as much as conventional hydrocarbon surfactants and significantly repel oil from surfaces. The PHOBOL® product used in this work was PHOBOL® CP-C, however, it will be referred to as PHOBOL® herein. PHOBOL® CP-C is a dispersion of a cationic fluoro-acrylate copolymer. UILTRAPHIL® is the trademark for another series of DuPont textile surfactant products sold by Huntsmann, which are used as hydrophilic fabric softeners.

The first step for preparing the proposed hydrophilic-oleophobic filter media of this work was to determine the most efficient ratio of PHOBOL-ULTRAPHIL mixtures. Varying ratio mixtures of PHOBOL® and ULTRAPHIL® were prepared in separate vials and vortexed. These surfactant mixtures were each pipetted and dispensed on individual samples (prepared by the same procedure as Filter #1) so that the membrane surface was completely saturated. The wet membranes were left to dry overnight, at room temperature, in air; and then heated in the oven at 120 C for 10 min. The PHOBOL-ULTRAPHIL ratio that modified the wettability of the surface to the highest hydrophilicity-oleophobicity difference was determined by static water and oil droplet contact angle measurements using an AST VCA Optima Goniometer.

Filter #2 was prepared by adding this surfactant mixture to Filter #1 samples and following the drying procedure explained above. To prepare Filter #3, only PHOBOL® was added as surfactant to Filter #1 samples. Other than the surfactant, the procedure for preparing Filter #3 was the same as Filter #2.

To produce Filter #2 and Filter #3 samples, heated materials produced as Filter #1 samples were saturated with PHOBOL-ULTRAPHIL (50:50) surfactant mixture and pure PHOBOL® surfactant respectively, then heated in oven at 120° C. for 10 minutes after blowing air directly through the samples for 5 minutes and allowing them to dry in air, overnight. Air was blown through the samples to remove any excess surfactant filling the pores of the samples.

Other embodiments of the present invention will be apparent to one skilled in the art. As such, the foregoing description merely enables and describes the general uses and methods of the present invention. Accordingly, the following claims define the true scope of the present invention.

What is claimed is:

1. A separation system comprising:
   a fluid conduit joined by an inlet to a cylindrical cyclone chamber, said inlet is located off-center from the center axis of said cylindrical cyclone chamber;
   a filtration section positioned above said cylindrical cyclone chamber, said filtration section having a first end in fluid communication with said cylindrical cyclone chamber and a second end in fluid communication with an overhead fluid outlet conduit;
   a liquid outlet providing fluid communication from a lower portion of said filtration section;
   a first liquid conduit in fluid communication with said liquid outlet, said first liquid conduit having a vertical section;
   a first liquid sensor and a second liquid sensor positioned on said vertical section of said first liquid conduit, said first liquid sensor acts as a high volume liquid sensor and said second liquid sensor acts as a low volume liquid sensor;
   a filtration media positioned within a central portion of said filtration section, said filtration media configured as a conduit such that an exterior surface of said filtration media and an interior surface of said filtration section form an annulus; and,
   a valve moveable from a first open position to a second closed position and wherein said first and second liquid sensors carried by said vertical section of said first liquid conduit control said valve.

2. The separation system of claim 1, wherein said filtration media has oleophilic-hydrophobic characteristics.

3. The separation system of claim 1, wherein said filtration media has hydrophilic-oleophobic characteristics.

4. The separation system of claim 1, wherein said filtration media comprises a first filtration media having hydrophilic-oleophobic characteristics and a second filtration media having oleophilic-hydrophobic characteristics.

5. The separation system of claim 1, wherein said filtration media is a single filtration media having hydrophilic-oleophobic characteristics and oleophilic-hydrophobic characteristics.

6. The separation system of claim 5, wherein one half of the surface area of said filtration media has hydrophilic-oleophobic characteristics and one half of the surface area of said filtration media has oleophilic-hydrophobic characteristics.

7. The separation system of claim 1, wherein said inlet has a cross-sectional area that is less than 30% of the cross-sectional area of said conduit.

8. The separation system of claim 7, wherein said inlet has a cross-sectional area that is between 22% and 30% of the cross-sectional area of said conduit.

9. A separation system comprising:
   a fluid conduit joined by an inlet to a cylindrical cyclone chamber, said inlet is located off-center from the center axis of said cylindrical cyclone chamber;
   a fluid collection chamber positioned below said cylindrical cyclone chamber, said fluid collection chamber having a first liquid outlet;
   a filtration section positioned above said cylindrical cyclone chamber, said filtration section having a first end in fluid communication with said cylindrical cyclone chamber and a second end in fluid communication with an overhead fluid outlet conduit;
   a second liquid outlet providing fluid communication from a lower portion of said filtration section;
   a pressure transducer in fluid communication with said fluid collection chamber and said overhead fluid outlet conduit;
   a filtration media positioned within a central portion of said filtration section, said filtration media configured as a conduit such that an exterior surface of said filtration media and an interior surface of said filtration section form an annulus;
   a first liquid conduit in fluid communication with said first liquid outlet;

a second liquid conduit in fluid communication with said second liquid outlet, wherein said first and second liquid conduits are joined in fluid communication by a junction; and, a valve positioned downstream of said junction, said valve moveable from a first open position to a second closed position and wherein said pressure transducer controls said valve.

10. The separation system of claim 9, wherein said fluid conduit joins said cylindrical cyclone chamber at an inclined angle.

11. The separation system of claim 9, wherein said filtration media has oleophilic-hydrophobic characteristics.

12. The separation system of claim 9, wherein said filtration media has hydrophilic-oleophobic characteristics.

13. The separation system of claim 9, wherein said filtration media comprises a first filtration media having hydrophilic-oleophobic characteristics and a second filtration media having oleophilic-hydrophobic characteristics.

14. The separation system of claim 9, wherein said filtration media is a single filtration media having hydrophilic-oleophobic characteristics and oleophilic-hydrophobic characteristics.

15. The separation system of claim 14, wherein one half of the surface area of said filtration media has hydrophilic-oleophobic characteristics and one half of the surface area of said filtration media has oleophilic-hydrophobic characteristics.

16. The separation system of claim 9, wherein said inlet has a cross-sectional area that is less than 30% of the cross-sectional area of said conduit.

17. The separation system of claim 16, wherein said inlet has a cross-sectional area that is between 22% and 30% of the cross-sectional area of said conduit.

18. A separation system comprising:
a fluid conduit joined by an inlet to a cylindrical cyclone chamber, said inlet is located off-center from the center axis of said cylindrical cyclone chamber;
a fluid collection chamber positioned below said cylindrical cyclone chamber, said fluid collection chamber having a first liquid outlet;
a filtration section positioned above said cylindrical cyclone chamber, said filtration section having a first end in fluid communication with said cylindrical cyclone chamber and a second end in fluid communication with an overhead fluid outlet conduit;
a second liquid outlet providing fluid communication from a lower portion of said filtration section;
a pressure transducer in fluid communication with said fluid collection chamber and said overhead fluid outlet conduit;
a filtration media positioned within a central portion of said filtration section, said filtration media configured as a conduit such that an exterior surface of said filtration media and an interior surface of said filtration section form an annulus;
a first liquid conduit in fluid communication with said first liquid outlet;
a second liquid conduit in fluid communication with said second liquid outlet, said second liquid conduit having a vertical section, wherein said first and second liquid conduits are joined in fluid communication by a junction;
a first valve positioned between said fluid collection chamber and said junction, said first valve moveable from a first open position to a second closed position and wherein said pressure transducer controls said first valve;
a first liquid sensor and a second liquid sensor positioned on said vertical section of said second liquid conduit, said first liquid sensor acts as a high volume liquid sensor and said second liquid sensor acts as a low volume liquid sensor; and,
a second valve positioned within said vertical section of said second liquid conduit, said second valve movable from a first open position to a second closed position, said second valve located between said second liquid sensor and said junction and wherein said first and second liquid sensors control said second valve.

19. The separation system of claim 18, wherein said fluid conduit joins said cylindrical cyclone chamber at an inclined angle.

20. The separation system of claim 18, wherein said filtration media has oleophilic-hydrophobic characteristics.

21. The separation system of claim 18, wherein said filtration media has hydrophilic-oleophobic characteristics.

22. The separation system of claim 18, wherein said filtration media comprises a first filtration media having hydrophilic-oleophobic characteristics and a second filtration media having oleophilic-hydrophobic characteristics.

23. The separation system of claim 18, wherein said filtration media is a single filtration media having hydrophilic-oleophobic characteristics and oleophilic-hydrophobic characteristics.

24. The separation system of claim 23, wherein one half of the surface area of said filtration media has hydrophilic-oleophobic characteristics and one half of the surface area of said filtration media has oleophilic-hydrophobic characteristics.

25. The separation system of claim 18, wherein said inlet has a cross-sectional area that is less than 30% of the cross-sectional area of said conduit.

26. The separation system of claim 25, wherein said inlet has a cross-sectional area that is between 22% and 30% of the cross-sectional area of said conduit.

* * * * *

UNITED STATES PATENT AND TRADEMARK OFFICE
CERTIFICATE OF CORRECTION

PATENT NO. : 10,967,316 B2
APPLICATION NO. : 16/040229
DATED : April 6, 2021
INVENTOR(S) : Ramin Dabirian et al.

Page 1 of 1

It is certified that error appears in the above-identified patent and that said Letters Patent is hereby corrected as shown below:

In the Specification

Column 7, Line 18, delete "UILTRAPHIL" and replace with --ULTRAPHIL-- therefor.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*